United States Patent [19]
Clippard, Jr. et al.

[11] 3,921,670
[45] Nov. 25, 1975

[54] MAGNETICALLY OPERATED VALVE WITH SPIDER ARMATURE

[75] Inventors: William L. Clippard, Jr.; Kaarel Kaera, both of Cincinnati, Ohio

[73] Assignee: Clippard Instrument Laboratory Inc., Cincinnati, Ohio

[22] Filed: July 1, 1974

[21] Appl. No.: 484,622

[52] U.S. Cl. ....... 137/625.65; 137/625.27; 251/129
[51] Int. Cl.² ................. F16K 11/04; F16K 31/02
[58] Field of Search..... 137/625.64, 625.27, 625.65; 251/30, 129, 130, 139, 141

[56] References Cited
UNITED STATES PATENTS

| | | | |
|---|---|---|---|
| 2,114,961 | 4/1938 | Gille | 251/129 |
| 2,860,850 | 11/1958 | Rhodes et al. | 251/139 |
| 3,250,293 | 5/1966 | Adams et al. | 251/129 |
| 3,422,850 | 1/1969 | Caldwell | 251/129 |
| 3,521,854 | 7/1970 | Leiber et al. | 251/129 |
| 3,531,080 | 9/1970 | Dillon | 251/129 |
| 3,670,274 | 6/1972 | Ellison | 251/141 |
| 3,877,488 | 6/1974 | Mack | 251/139 |

*Primary Examiner*—Martin P. Schwadron
*Assistant Examiner*—George L. Walton
*Attorney, Agent, or Firm*—Wood, Herron & Evans

[57] ABSTRACT

An electrically controlled valve having a magnetically responsive armature which is positioned at the center of a "spider." The armature is supported and biased axially by a plurality of springs that radiate outwardly from it. The springs support the armature for elastic movement in the axial direction, and hold it biased against a first port, so that the armature also functions as a valve element which normally closes that port. A magnet coil is positioned so that when energized it overcomes the bias of the springs and draws the armature away from the first port. In one embodiment an opposed second port is closed by the armature when the first port is opened.

12 Claims, 4 Drawing Figures

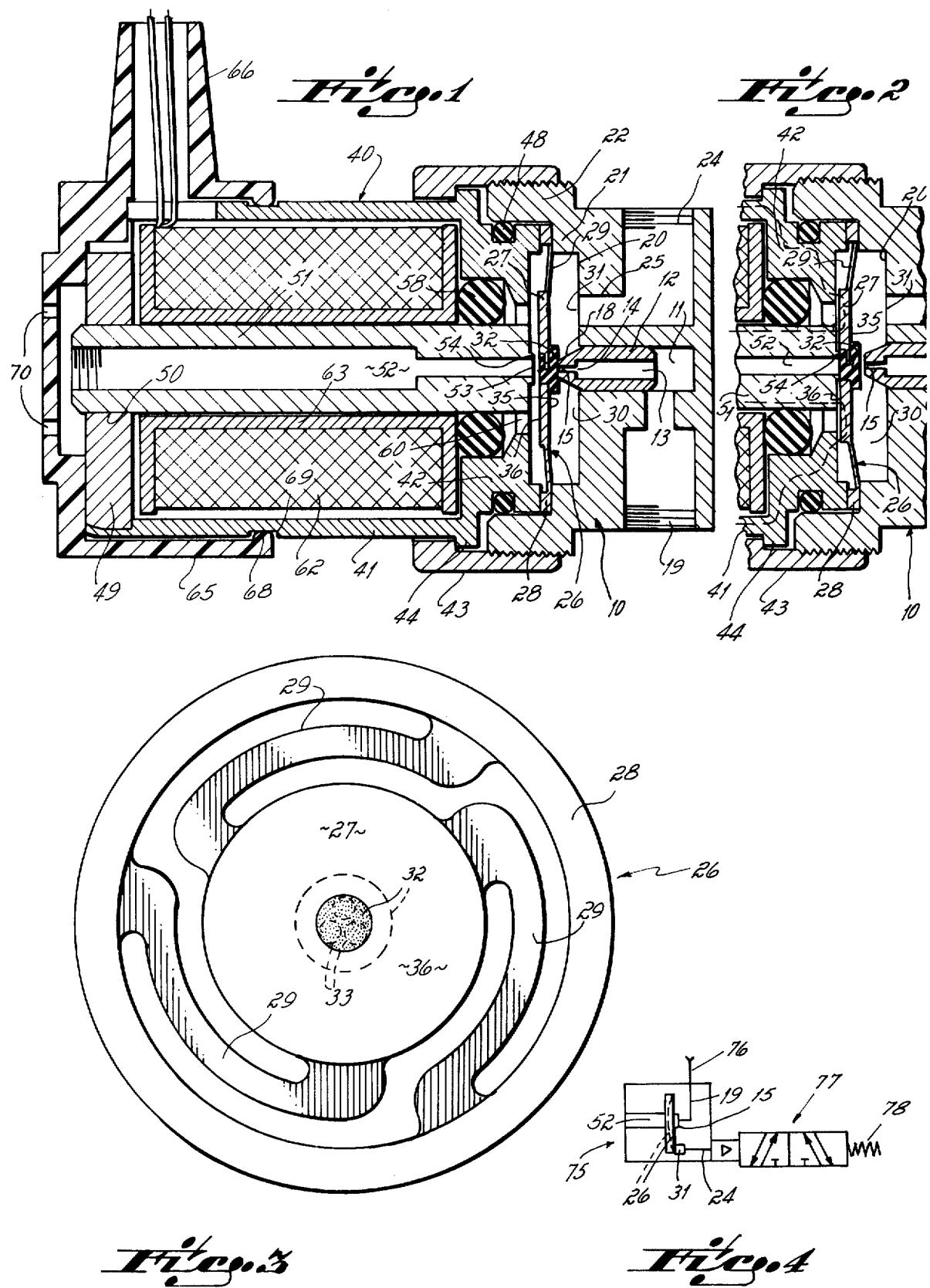

MAGNETICALLY OPERATED VALVE WITH SPIDER ARMATURE

This invention relates to valves of the electrically controlled, magnetically operated type. More particularly, the invention relates to a valve of this type having a movable valve element which is in the form of a "spider," and which also comprises the armature operated by the electromagnet coil. The spider includes springs which bias the armature-valve element against a port, so that the armature normally closes the port. No power is consumed in the normal condition of the valve.

It has been the principal objective underlying this invention to provide a magnetically operated type valve wherein the application of a very small amount of electric power to the magnet coil will control switching of a relatively large input pressure, with crisp "turn on and turn off" response to application of the energizing current.

Valves in accordance with the present invention are particularly useful in pneumatic control circuits, and may be used, for example, to control air piloted power valves. Examples of such valves are shown in the U.S. patents to Clippard, Nos. 3,766,935 and 3,786,831.

Briefly described, a valve in accordance with the invention includes body structure presenting a first port entering an internal cavity or chamber. Flow through that port is controlled by a movable valve element which is a magnetically responsive armature in the form of a "spider." More specifically, the armature is at the center of the spider, and the "legs" of the spider comprise a plurality of springs that extend radially or transversely outwardly. At their outer ends, the springs are mounted so that they bias or press the armature against the first port, so that that port is normally closed. The spider thus provides support for the armature that obviates the sliding friction or "scrubbing" that accompanies solenoid-type armatures. In one embodiment, a second port enters the cavity directly opposite the first port, on the other side of the armature. This second port is normally open, and when the coil is energized it draws the armature toward the second port so that that port is restricted or closed simultaneously as the first port is opened and placed in communication with a third port.

Alternatively, the second port may be omitted, the armature used to control flow between the first port and another port that communicates with the cavity.

It is recognized that Rhodes et al. U.S. Pat. No. 2,860,850 shows an electrically operated pneumatic valve wherein a combination valve member and magnetically operated armature in the form of a disk is biased by a coil spring so as normally to close an outlet passageway. Energization of a solenoid opens the valve against bias of the coil spring. The armature is not in the form of a spider, and it is biased by a relatively heavy coil spring that acts axailly on it.

Linden U.S. Pat. No. 3,443,582 shows a pressure control valve having a nozzle which is normally closed by an armature supported by a hydraulically damped flexible diaphragm. No spring biasing spider is shown, and there is no double valving action.

Englund et al. U.S. Pat. No. 3,550,614 shows a valve wherein a seat is closed by a solenoid operated reciprocable armature, the armature carrying, as it slides, an elastically flexible sealing member. However, the armature is not a disk, and it is biased by a coil spring. No spider is shown, and there is no double action of the armature between opposed ports.

A magnetically controlled, normally closed valve is shown in Dillon U.S. Pat. No. 3,531,080. In that valve a magnetically responsive armature carries a reciprocable shaft which is normally biased by a coil spring, against a port to which pressure is supplied. A separate spider is used to support the armature for axial sliding movement, but the spider does not bias the armature.

Mack U.S. Pat. No. 3,817,488 is directed to a solenoid valve wherein the armature comprises a spider and is operable as a valve element. That structure differs from this in that there the armature is magnetically actuable toward a nozzle which is normally open. The armature is not spring biased, and a continuous air bleed occurs in use. Also, there is no double or simultaneous valving of opposed ports in that structure.

The advantages and features of this invention can best be further explained by reference to the accompanying drawing, in which:

FIG. 1 is an axial section of a preferred form of valve in accordance with the invention, showing the valve in the normal, magnet de-energized condition;

FIG. 2 is a fragmentary view similar to FIG. 1 but showing the valve in the energized condition;

FIG. 3 is an enlarged plan view of the spider-armature of the valve shown in FIGS. 1 and 2, and FIG. 4 is a diagrammatic illustration showing use of the valve as a pilot valve to control a four-way valve.

By way of specific example, the invention is further described herein as a miniature pneumatic control valve which is particularly adapted to be used with modular valves of the type shown in Clippard U.S. Pat. Nos. 3,766,935 and 3,786,831, previously referred to. However, it will be understood that the utility of the valve is not limited to that particular embodiment or use, and that the drawing merely illustrates a preferred embodiment for use with valves of the type shown in those patents.

The preferred valve embodiment illustrated includes body structure 10 which is adapted to be received in one end of the internal cavity of the manifold body of valves of the type shown in the Clippard patents referred to above. Body 10 has a stopped central bore 11, in which is secured an insert 12 that presents an axial first passage 13 that leads through a stepped bore 14 to a first port 15. A tip 18 of small area is presented by insert 12 around first port 15, and forms a small seat for a movable valve element to be described. A passage 19 leads radially through body 10 to the inner end of bore 11, and in use a fluid conduit, not shown, may be coupled to this bore 19.

Body 10 is recessed, as at 20, around the projecting tip 18 of insert 12. A shirt 22 surrounds recess 20, thereby defining an internal cavity or valve chamber 30. An internal shoulder or ledge 21 is formed around skirt 22, and this shoulder is spaced axially from the recess 20. An element 26, referred to herein as a "spider," is seated on shoulder 21. The spider is yieldable, in the axial direction, as a spring. In preferred embodiment, as best shown in FIG. 3, spider 26 is a one piece element which includes a unitary central portion or armature 27 and a peripheral or mounting portion 28, these portions being connected by arcuate spiderlike arms 29 which act as springs between the portions 27 and 28.

At its center the armature 27 carries an elastomeric port sealing member 32. The member 32 can be attached to the armature in various manners, but it is especially convenient to mold it integrally to the armature, through a plurality of holes 33 in the center portion 27 of the armature (three such holes are shown in dotted lines in FIG. 3). As can be seen in FIG. 1, the elastomeric member 32 projects slightly in the axial direction from the face or surface 35 of the armature which faces the first port 15. The elastomeric member 32 is substantially flush with the rear or opposite surface 36 of the armature.

The spring arms 29 of the spider are preferably of reduced thickness, as compared to the outer edge portion 28 and the armature or center portion 27, to reduce their mass and to reduce the spring rate when the armature is displaced axially relative to the edge. The spider is formed of a magnetically responsive but not permanently magnetizable (i.e., ferromagnetic) material which is also springlike. Such materials are commercially available, and do not comprise the invention. The portions having reduced thickness can be formed by electrochemical milling. It is also desirable to reduce the thickness of the central portion around the holes 33, so that the elastomeric "button" 32 is flush with surface 36, see FIG. 1.

The peripheral portion 28 of the spider is clamped on shoulder 21 of body 10 in a plane forward, i.e., to the right in FIG. 1, of the position at which the elastomeric member 32 comes to bear against port 15. In this position, stress is imparted to spring arms 29 of the spider, which urges the center portion or armature, including the elastomeric member therein, to the right and against the first port, so that normally (i.e., when the coil to be described is not energized), the armature closes and seals port 15 and a force of certain magnitude is required to draw the armature away from that port and open that port to chamber 30. Passages 24 and 25 lead through body 10 to a third port 31 which also opens to chamber 30.

The spider is clamped on shoulder 21 by a coil carrying case designated generally at 40. Case 40 includes a ferromagnetic or a magnetically responsive outer shell or cylinder 41 which has a centrally extending rim or flange 42 at one end thereof, i.e., the right end in FIG. 1, and which bears against the peripheral portion 28 of the spider. An internally threaded screw collar 43 is carried on a retaining rib 44 around shell 41, and this collar 43 is knurled so that it can be threaded onto body skirt 22, thereby to hold the body and case together with the spider rim 28 clamped between them. An O-ring 48 is carried in a peripheral groove around flange 42, and forms a seal with the inside surface of body skirt 22 to prevent loss of fluid pressure in operation.

At its outer or left end in FIG. 1, shell 41 is provided with an end plate 49 which has a bore 50. In this axial bore 50 is secured a central core, also ferromagnetic, designated at 51. Core 51 has an axial bore which establishes a second fluid passage 52 and which leads at its inner end to a second port 53. A boss or nozzle-like rim 54 may be provided at the end of core 51 around second port 53, sized slightly smaller than the elastomeric member 32 which it faces, to perfect the seal with the elastomer when the coil is energized. It can be seen (FIG. 1) that the axes of passages 13 and 52, and of ports 15 and 53, are aligned axially with one another on opposite sides of the armature 27. An O-ring 58 provides a fluid seal between core 51 and the outer shell.

An electric coil 62, wound on a spool or bobbin 63, is mounted on core 51 within shell 41 between end cap 49 and flange 42. It will be noted that an "air" gap 60, in the magnetic path of coil 62, is presented between core 51 and the radially inner edge of flange 42. It should also be noted that the diameter of armature 27 is greater than that of this air gap 60, so that the armature overhangs flange 42. A snap-on cap 65 covers and encloses the end of the coil assembly, and includes an access opening or bracket 66 for the electrical leads to coil 62. Cap 65 has an inwardly facing rib or detent 68 which is cooperable with an external groove 69 on shell 41 to form a snap connection for holding the cap on the shell. Breather or vent holes 70 are provided in the end of the cap, to permit communication between atmosphere and passage 52. The end of the cap may be formed as a "knock out" portion, to permit a pressure connection to be made to passage 52, for certain modes of use as described later.

In one mode of use, a source of pressure air is connected to passage 19 and the first port 15 is thus a pressure port which is normally closed. The second port 53 is vented to atmosphere via second passage 52 and is normally open. Passage 24 is connected to an object upon which work is to be done (e.g., a cylinder, or to the spool of a second stage valve), and port 31 thus is a control port.

When magnet coil 62 is energized a magnetic field is set up around it in the circuit including core 51, end plate 49, shell 41, flange 42, across air gap 60 via the center portion 27 of spider 26, and core 51. The magnetic circuit is shown by the dashed lines in FIG. 2, and the armature center portion of the spider is magnetically drawn toward the second port, i.e., to the left as shown in FIG. 2, the magnetic circuit extending via flange 42, the center portion of the spider, and the core.

The magnitude of the magnetic force exerted on the armature, in comparison to the opposing spring force exerted by spring arms 29, is sufficient to overcome the spring bias, and the armature 27 of the spider is drawn away from first (or pressure) port 15, toward second (or vent) port 53. It is desirably (but not necessary) that the armature be moved sufficiently actually to seal port 53, but in any event the armature movement in response to energization of the coil should be sufficient to restrict flow via vent 53 from chamber 30 (supplied thereto from pressure port 15, now open). As this occurs, fluid communication is established between pressure port 15 and the third (or control) port 31. When high pressures are applied to port 15, the spring force of arms 29 on the armature 27 may be insufficient to hold the valve closed and prevent bleed, and it is contemplated that in that event a supplemental coil spring may be used to provide the total force necessary to hold the valve closed, the spider supporting the armature.

FIG. 4 illustrates one typical use for the valve, in which it acts as a first stage control for a second stage four-way valve. Input pressure is applied via a line 76 to the valve, which is indicated diagrammatically at 75. The valve is normally closed by the spring bias of spider 26. In this condition port 31 of the bore 24 is vented through passage 52 (and through the cut away portions between the armature spring arms 29, not shown in FIG. 4). Thus, essentially atmospheric pressure acts on one end of the spring biased spool 77 of a three way valve. A bias spring 78 normally holds the spool in a first condition. When the coil is energized, the armature 27 is drawn to the position indicated by the dotted lines in FIG. 4, thereby closing or restricting passage 52 and opening a pathway between first port 15 and port 31. This applies a control pressure from passage 19 to the end of spool 77, which overcomes the bias of spring 78 and causes the spool to shift to its second position.

By way of example, where the invention is embodied in such a miniature pneumatic control valve, the range of armature movement, i.e., the spacing between rim 54 and the opposite face 36 of the armature may be about 0.010 inch, although this will of course vary with and depend upon pressure, bore sizes and the like. Inlet pressures up to about 150 psi can be controlled at a very fractional wattage power consumption, by reason of the low mass, low friction armature and its mounting. The spider configuration provides very uniform operation in that it holds the shiftable armature center portion precisely perpendicular to the axes of the ports. Thus, a relatively large inlet pressure can be "switched" to control port 31, with a very small power input. This enables transistor output signals to be directly converted to high pressure pneumatic power without amplification.

In another mode of use, second passage 52 and second port 53 may be plugged or omitted altogether. Pressure fluid (either pneumatic or hydraulic) at first port 15 is then valved by the armature to flow to port 31. This mode is useful for controlling an air jet or a liquid jet.

In still another mode of use, the connections may be reversed from those previously described, so that the valve is operated in a normally open mode. This can be done by applying pressure to port 53, so that fluid will normally flow to port 31, first port 15 normally being closed. When the coil is energized, the armature closes port 53 and the pressure is diverted to port 15. Alternatively, port 31 may be the pressure port, with the armature diverting pressure from port 53, to port 15 when the coil is energized.

Other applications of the present valve will be readily apparent to those skilled in the art.

Having described our invention, what is claimed is:

1. A magnetically operated valve comprising, body structure presenting a chamber and first and second passages leading to opposed, spaced apart first and second ports entering said chamber, a spider positioned between said first and second ports, said spider including a central magnetically responsive disklike armature with opposite transverse faces for engaging the first and second ports respectively, said spider also including a plurality of springs angularly spaced around said armature and radially supporting the armature so that it can be displaced axially, said springs outwardly being connected to mounting means at a position offset axially from said first port, such that said springs are stressed both axially and radially and one face of said armature is normally pressed and biased against said first port by the stressing of said springs, the opposite face thereof normally being spaced from said second port, so that said armature thereby restricts flow through the first port and leaves said second port open, the stressing of the springs which radially support the armature being the sole force which biases the armature against said first port, and an electric coil having a core magnetically responsive to energization of said coil, said core positioned to act magnetically on said armature to draw it away from said first port against the bias of said springs and toward the second port so that said armature restricts the second port and the first port is opened.

2. The valve of claim 1 further including a third port entering said chamber and communicating with said second port between said springs when said armature closes said first port.

3. The valve of claim 1 wherein said springs comprise flat, spaced apart spring arms which spiral outwardly around said armature, said arms being stressed in bending to bias said armature.

4. The valve of claim 3 wherein said armature and springs are formed integrally with one another, said spider further comprising a peripheral rim outwardly of and connected to said springs, said peripheral rim engaged by said mounting means.

5. The valve of claim 4 wherein said spring arms are of reduced thickness in comparison to said armature and said peripheral rim.

6. The valve of claim 1 wherein said armature carries an elastomeric member positioned to bear upon and thereby restrict said first port when said coil is not energized, and to bear upon and thereby restrict said second port when said coil is energized, said armature having a hole through it, said elastomeric member being molded integrally through said hole and extending around the hole on both transverse faces of said armature.

7. The valve of claim 6 wherein said elastomeric member projects axially from said armature on the face thereof which faces said first port, normally to seal said first port.

8. The valve of claim 7 wherein said elastomeric member is substantially flush with the face of said armature that is toward said second port.

9. A magnetically operated valve comprising, body structure presenting a chamber and a first port entering said chamber, another port also entering said chamber, a spider positioned in said chamber and including at its center a magnetically responsive armature having a transverse face engaging and closing the first port, said spider also including a plurality of springs angularly spaced around and connected to said armature and radially supporting the armature so that it can be displaced axially away from said first port, said springs outwardly being connected to mounting means at a position offset axially from said first port, such that said springs are stressed and said armature is pressed and biased against said first port by the stressing of said springs, the stressing of the springs which radially support the armature being the sole force which biases the armature against said first port, and an electric coil having a core magnetically responsive to energization of said coil, said core positioned to act magnetically on said armature to draw it away from said first port against the biasing thereon of said springs.

10. The valve of claim 9 wherein said springs comprise flat arms which are stressed in bending.

11. The valve of claim 9 wherein said other port is on the same side of said chamber as said first port.

12. The valve of claim 9 including a further port which is axially aligned with said first port but on an opposite side of said armature therefrom.

* * * * *